March 21, 1950

C. O. BACK 2,501,490

RODENT TRAP

Filed May 21, 1948

2 Sheets-Sheet 1

INVENTOR.
C. O. Back,
BY Scott L. Norvell
ATTORNEY

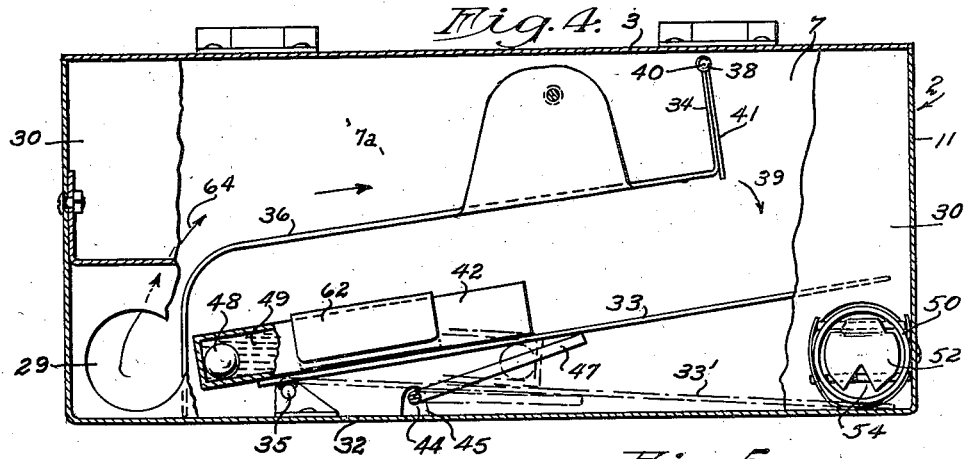
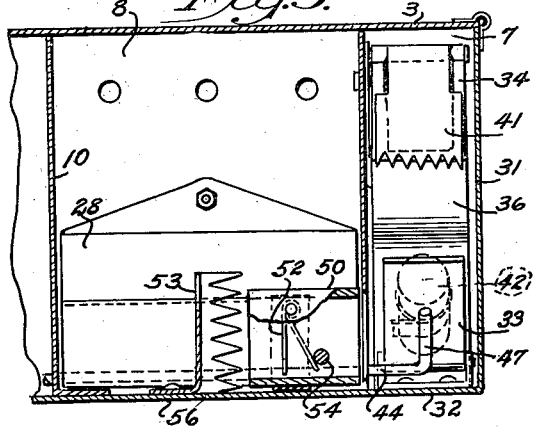
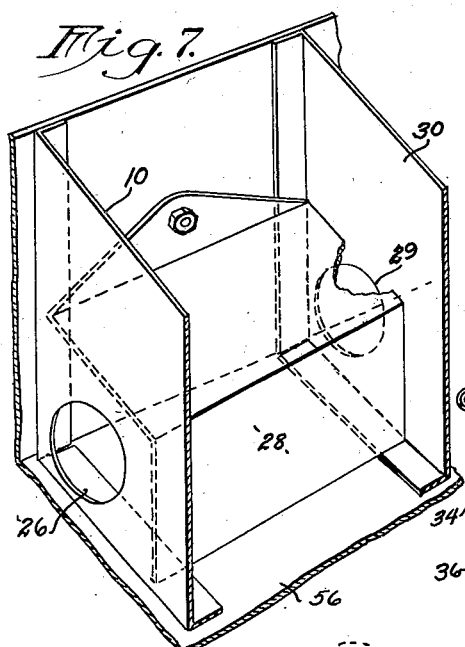
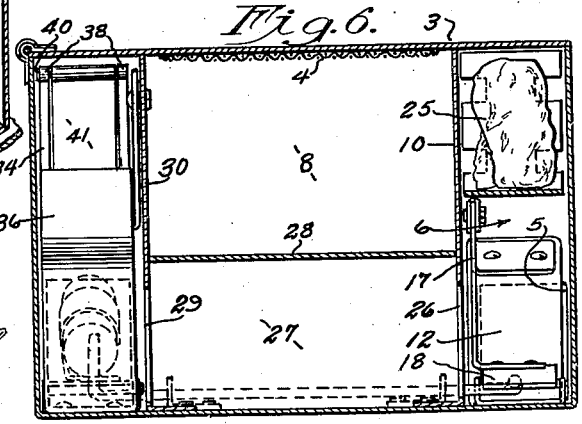
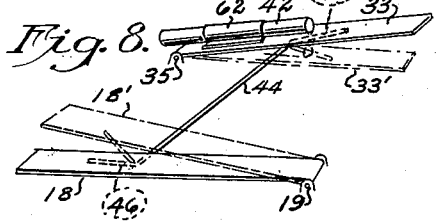

Patented Mar. 21, 1950

2,501,490

UNITED STATES PATENT OFFICE 2,501,490

RODENT TRAP

Clifford Osmon Back, Safford, Ariz.

Application May 21, 1948, Serial No. 28,389

3 Claims. (Cl. 43—76)

This invention pertains to self-setting rodent traps of the automatic reset type.

One of the objects of this invention is to provide a trap of simple cheap and efficient construction arranged so that it is normally in set condition and so that the entrance of a rodent to be trapped will actuate the trapping mechanism in the first phase of its operation and will reset the mechanism in the second phase of the operation.

A second object is to provide a trap with a series of passageways wherein the bait is set and lighting holes are provided to take advantage of the natural instincts, actions and reactions of the rodent whereby to operate an entrance or trapping gate to first trap the rodent, then urge it on into a central pen, over devices which will bar its return and reopen the entrance gate to reset the trap.

A third object is to provide a rodent trap with an entrance runway closed by a swinging door, a hinged floor plate therein and operatively connected to said door, a reset runway, and a hinged floor plate therein, balanced by intermediate mechanism against said entrance runway plate, and mechanism for detaining the entrance runway floor plate in either raised or lowered position whereby said entrance door is held in either open or closed position.

Other objects will appear hereinafter.

Figure 1:
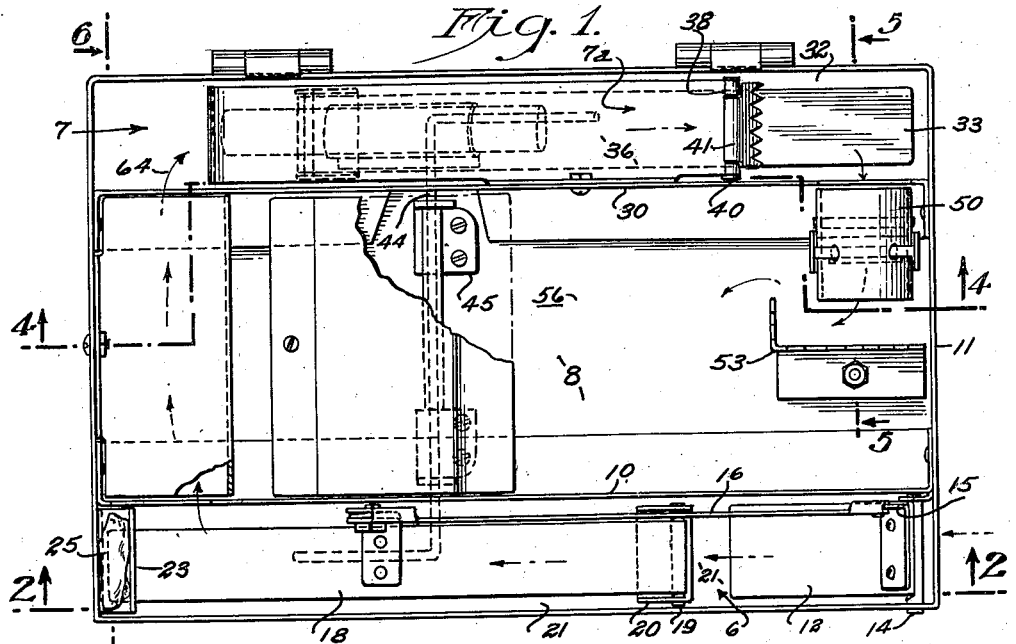
Figure 2:
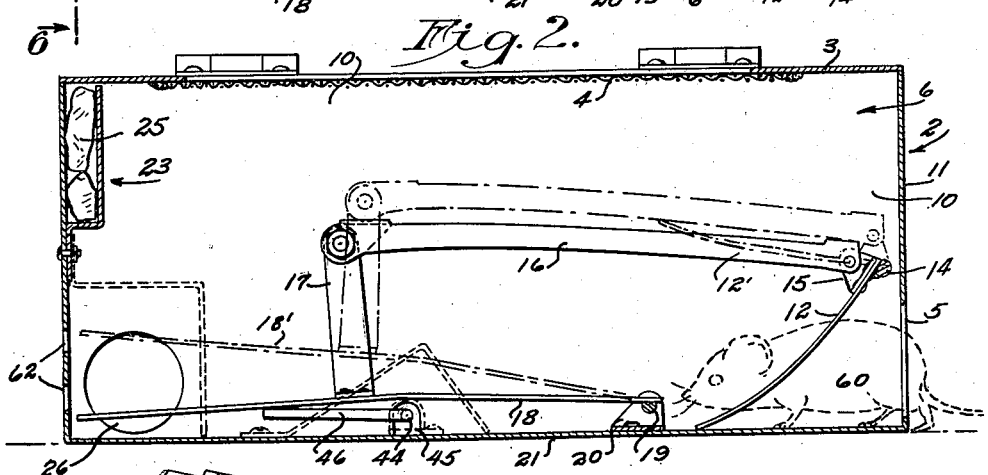
Figure 3:
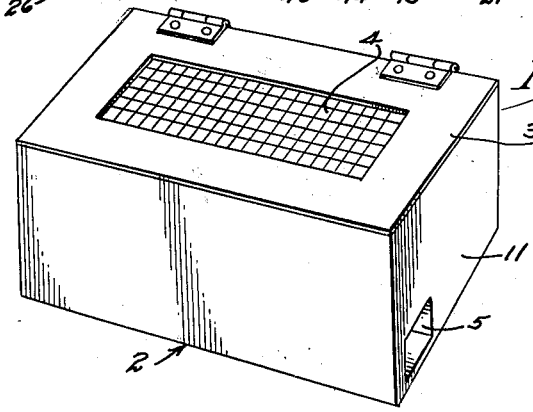

I attain the foregoing objects by means of the construction and devices shown in the accompanying drawings, in which:

Figure 1 is a plan view of the trap with the hinged cover removed;

Figure 2 a side elevation thereof with the near side wall sectioned off substantially along line 2—2, Figure 1;

Figure 3, a perspective view of the trap drawn on a somewhat reduced scale; Figure 4, a sectional side elevation taken on lines 4—4 of Figure 1, and drawn on the original scale;

Figure 5, a partial sectional end elevation taken on line 5—5, Figure 1, and looking toward the entrance end of the trap;

Figure 6, a sectional elevation taken on line 6—6, Figure 1, and looking toward the front end of the entrance runway;

Figure 7, a perspective view of a fragmentary portion of the back end of the central pen or corral or the trap; and Figure 8, a perspective view, in semi-diagrammatic form, of a portion of the resetting mechanism.

Similar numerals refer to similar parts in the several views.

The trap is enclosed in a rectangular metal case 2 with an open top closed by a lid 3, having a centrally located screened ventilating window 4. An entrance hole 5 is cut in the lower left hand corner of the front of the case 11, as viewed in Figure 3.

The interior of case 2 is divided by partitions 10, 30, and 28 to form a central pen 8, surrounded on three sides by runways, including an entrance runway 6, commencing at the entrance hole 5 and extending along the left side of the case, a transverse passageway 27 extending along the back thereof, and a reset runway 7 along the right side.

Entrance hole 5 is closed by over-head hinged door 12 supported on hinge pin 14. A crank 15 extending outward from the upper portion of the door is connected by link 16 to a crank arm 17 extending upward from entrance runway floor plate 18. This plate is hinged on pin 19 to lugs 20 on the floor 21 of runway 6 and positioned so that the free end of plate 18 extends inward from entrance opening 5. The crank 15, link 16, and arm 17 are proportioned and positioned so that when the plate 18 is in the lowered position, as indicated by solid lines, the entrance door 12 is closed as also shown by solid lines (see Figure 2). A bait rack 23, is positioned at the inner end of this runway. Food or bait 25, attractive to the rodent to be trapped, is placed in this rack.

At the inner end of the entrance runway an exit hole 26 is cut in partition 10. This opens into a transverse passageway 27, formed by plate 28, leading to the reset passageway 7 through hole 29 in partition 30. On the floor 32 of passageway 7, floor plate 33 is hinged on pin 35 near the entering end adjacent hole 29.

A curved plate 36 is attached laterally to partition 30 to form an elevated portion 7a of this runway separated from the exit end adjacent tube 50. This runway is, of course, closed at the top by case lid 3. At the entering end plate 36 is curved down to rest on floor 32. At the opposite or elevated end the plate is centrally slotted and the edges bent upward at 34 to form journals 38 for hinge pin 40. A plate forming a non-return gate 41 is hinged on pin 40, has a toothed lower edge, and normally rests against the end of plate 36 to stop rearward swing. Plate 36, in addition to providing the elevated runway 7a, covers the hinged end portion of reset plate 33 and the positioning tube 42 which is attached to its upper face approximately over the axis of hinge pin 35. The terminus of plate 36 at bend 34 forms a drop off or fall 39 just above the free end of reset plate 33, and the rodent passing through non-return gate 41 must jump downward upon this free end of the plate.

A re-set rocking shaft 44 extends transversely of case 2 and is journaled in bearings 45 fastened to the floor 56 of the central portion of the case bottom. One end of this shaft extends beneath the entrance runway plate 18 and is bent at right angles away from the hinged end of this plate to form a lift arm 46. At the opposite end this shaft is bent at right angles away from the hinged end or reset runway floor plate 33 to form a reset lift arm 47. These arms operate under and push upward on their respective floor plates as shaft 44 is rotated, and are positioned radially so that, as the reset runway plate 33 hinges downward from the position shown in solid lines in Figures 4 and 8, lift arm 47 is pressed downward and the shaft 44 rotated clockwise. This motion swings arm 46 upward and lifts entrance runway plate 18 to the position shown by dotted outline 18'. This, in turn, operates link 16 so that it raises door 12 to the opened position indicated by dotted lines 12'. When plate 18 is, in turn, depressed by the weight of rodent on its free end, a reverse action takes place.

Positioning tube 42 is mounted to extend longitudinally parallel to and on the face of reset plate 33 with its middle slightly to the right of and above hinge pin 35. This offset position tends to balance the weight of door 12 and link 16 attached to plate 18. Tube 42 is sealed at each end and contains a spherical weight, such as metal ball 48, which is free to roll from one end to the other, being slowed somewhat by oil 49 with which the tube is filled. The oil not only damps its rolling movement, but also prevents bouncing of the ball after it hits the ends of the tube.

Partition 30 is pierced near the front end of the reset passageway 7 and a tube 50 placed adjacent the hole thus formed to provide an exit from this passageway. A non-return swinging plate 52 is suspended on hinge pin 53 in this passageway and has a toothed lower edge. A stop pin 54 closes the lower portion of the passageway leaving only sufficient space above it to permit passage of the largest rodent to be trapped. This tube forms an entrance into the central pen or corral 8. A fence 53 is formed in front of and adjacent the inner side of the exit from this tube by a plate attached to the bottom of the pen. A toothed top edge on this fence prevents return of trapped rodents from pen 8 to runway tube 50 and keeps those trapped from interfering with the entrance of others.

In operation, rodent 60 finding entrance hole 5 open and smelling bait 25 at the inner end of passageway 6, and being attracted by light entering through holes 62, enters this passageway and goes toward the bait. Its weight on the free end of entrance floor plate 18 depresses it to the position shown by solid lines, Figure 2. This closes door 12 by means of link 16, depresses arm 46, raises arm 47, which raises plate 33 to the position shown in solid lines, Figure 4, and ball 48 rolls to the left end of tube 42. The noise of this operation excites the rodent and it tries to escape the way it came in. Finding the entrance door closed and held closed, it returns toward the bait and finds hole 26 leading through transverse passageway 27 to reset passageway 7. Once in passageway 7, the rodent seeks to escape by returning in the opposite direction from which it entered passage 6. It, therefore, goes in the direction indicated by arrows 64, climbs onto plate 36, pushes through gate 41, and drops down onto the free end of reset plate 33. This plate then tilts downward to the position indicated by dotted outline 33'. Downward motion of this plate turns arm 47 on reset shaft 44 downward, raises arm 46 and plate 18, and opens entrance door 12. This open position is maintained by the rolling of ball 48 to the right end of tube 42. The noise of this motion makes the rodent frantic and it quickly seeks escape from this front end of passageway 7. It, therefore, goes through tube 50 and gate 52 and enters pen 8. Once in this pen there is no escape, and the rodent is fully trapped. Since the entrance gate is opened, the trap is reset and ready to receive another rodent. At convenient intervals the lid is opened and the trapped rodents removed.

From the foregoing, it will be noted that I have provided a continuous U-shaped passageway leading from the entrance opening 5 to the pen 8. After entering opening 5 the rodent 60 traps itself by the closing of door 12, and again resets the trap by dropping onto the free end of plate 33. The cooperative up and down action of the two floor plates 18 and 33 makes this resetting action possible; but to prevent failure, and to give each position a definite dwell, the positioning tube 42 is necessary. This tube, positioned as shown, is simple and fool-proof, and by sliding the tube lengthwise in its holding clamp 62, definite and proper balancing of these two plates and their attendant parts is easily achieved.

In the form shown, the trap is best adapted to trapping mice and rats, but only small variations are needed to adapt it to trap other similar rodents, or the like.

Since various modifications of the exact form shown are possible, and many mechanical equivalents can be substituted for the several working parts, I wish to be limited only by the following claims.

I claim:

1. A resetting rodent trap having a rectangular case provided with a centrally disposed pen, an entrance opening, an entrance closing door hinged over said opening, an entrance runway having a floor extending from said entrance opening, a bait positioned therein, a reset runway having a floor connected to said entrance runway and opening through a non-return gate into said pen, an entrance door closing plate hinged at one end to the floor of said entrance runway and operatively linked to said entrance door to close said door when depressed, a reset plate hinged to the floor of said reset runway and operatively connected to said entrance door closing plate so that it will raise said door closing plate when depressed, an elevated runway formed at the entering end of said reset runway having a non-return hinged gate at its exit end positioned above the free end of said reset plate; and a positioning element attached to said reset plate including a closed tube containing a spherical weight adapted to roll from one end to the other of said tube, whereby said door closing plate will be detained in either raised position holding said door open, or a depressed position holding said door closed.

2. A resetting rodent trap, including a rectangular case having a solid bottom plate forming a floor, an entrance opening in the front end thereof adjacent one side, and a hinged lid; vertical partitions therein providing a central pen, an entrance runway extending along one side of said case from said entrance opening to the rear of said case; bait positioned at the rear of said runway; a transverse passageway extending along the rear of said case, and a reset runway extending along the side of said case opposite said entrance runway, opening into said pen through a tube containing a non-return hinged gate, an over-head hinged door closing said entrance opening; a door closing plate hinged to its floor, and crank levers on said floor plate and said entrance door connected by a link so that when said floor plate is raised said door is held in raised open position and when said plate is depressed said door is held in lowered closed position; a plate extending from the floor of the rear portion of said reset runway dividing it into an elevated runway in the rear portion thereof and a lower portion in the front portion, and terminating in an elevated platform having an elevated non-return swinging gate, a reset plate hinged to the floor of said reset runway and positioned with its free end beneath said non-return swinging gate; a floor plate coordinating shaft journalled on the floor of said case and extending transversely thereof with its ends beneath said plates, bent to form radially extending cranks contacting the underside of said floor plates, and positioned so that when either one of said floor plates is raised the other is depressed; and a tilting positioning element attached to said reset plate adapted to detain said plate in either depressed or raised position, said element including a longitudinally disposed closed tube positioned over the hinge axis of said reset floor plate and having a spherical weight thereon free to roll to either end of said tube but being slightly detained by fluid contained therein.

3. In a resetting rodent trap having a case, a central pen therein, an entrance opening, a continuous runway leading from said entrance opening to said pen, and a hinged entrance closing door, mechanism for closing and opening said entrance door including, a door operating plate hinged adjacent said door and operatively linked to said door and adapted to swing said door downwardly to close said entrance when the unhinged end of said plate is depressed, and adapted to swing said door to opened position when the unhinged end of said plate is raised; a parallelly positioned reset plate, hinged in said passageway and extending in a reversed direction to that of said door operative plate, a shaft having radial arms at each end, each arm being operatively connected to a plate so that they are maintained in balanced condition; and a positioning mechanism for detaining said door and door operative plate in either raised or lowered position, including a closed tube containing a liquid and a freely rolling ball weight, said tube being positioned on and parallel to said reset plate, and above the hinge thereof, whereby when said plate is in lowered position said ball rolls to the lowered end of said tube lending its weight to maintain said plate in said lowered position, and when said plate is raised said ball rolls to the opposite end of said tube lending its weight to maintain said plate in raised position; the motion of said ball being damped by said liquid through which it must travel.

C. O. BACK.

REFERENCES CITED

The following references are of record in the file of this patent:

UNITED STATES PATENTS

| Number | Name | Date |
| --- | --- | --- |
| 1,589,086 | Anderson | June 15, 1926 |
| 2,010,191 | Koch et al. | Aug. 6, 1935 |
| 2,225,251 | Andrick | Dec. 17, 1940 |